(12) United States Patent
Chen et al.

(10) Patent No.: US 11,940,377 B2
(45) Date of Patent: Mar. 26, 2024

(54) DEVICE AND METHOD FOR DETECTING A SURFACE DEFECT USING INTERFERENCE BETWEEN POLARIZED LIGHTS

(71) Applicant: SKYVERSE TECHNOLOGY CO., LTD., Guangdong (CN)

(72) Inventors: Lu Chen, Shenzhen (CN); Youwei Huang, Beijing (CN); Gaozeng Cui, Beijing (CN); Timmy Wang, Beijing (CN)

(73) Assignee: Skyverse Technology Co., Ltd., Shenzhen (CN)

( * ) Notice: Subject to any disclaimer, the term of this patent is extended or adjusted under 35 U.S.C. 154(b) by 413 days.

(21) Appl. No.: 17/257,962

(22) PCT Filed: Jul. 8, 2019

(86) PCT No.: PCT/CN2019/094976
§ 371 (c)(1),
(2) Date: Jan. 5, 2021

(87) PCT Pub. No.: WO2020/007370
PCT Pub. Date: Jan. 9, 2020

(65) Prior Publication Data
US 2021/0270725 A1    Sep. 2, 2021

(30) Foreign Application Priority Data

Jul. 6, 2018 (CN) .......................... 201810737921.4

(51) Int. Cl.
*G01N 21/21* (2006.01)
(52) U.S. Cl.
CPC .................................... *G01N 21/21* (2013.01)
(58) Field of Classification Search
CPC ........... G01N 21/21; G01N 2021/8848; G01N 2201/0683; G01N 21/9501; G01N 21/01;
(Continued)

(56) References Cited

U.S. PATENT DOCUMENTS 5,032,734 A    7/1991   Orazio, Jr. et al.
6,528,333 B1   3/2003   Jun et al.
(Continued)

FOREIGN PATENT DOCUMENTS

CN          1051975 A    6/1991
CN        201732057 U    2/2011
(Continued)

OTHER PUBLICATIONS

International Search Report and Written Opinion for Application No. PCT/CN2019/094976, dated Sep. 27, 2019.
(Continued)

*Primary Examiner* — Roy M Punnoose
(74) *Attorney, Agent, or Firm* — MARSHALL, GERSTEIN & BORUN LLP

(57) ABSTRACT

The present invention provides a detection device and a detection method. The detection device uses the signal light formed by the interference of the first and the second echo lights reflected on the surface of the component to be detected to obtain the first light intensity distribution information of the signal light corresponding to the sampling position on the component to be detected by the first detection device to obtain the phase distribution of the signal light according to the intensity distribution to obtain the defect distribution data of the component to be detected. Among them, the first detection apparatus includes more than two polarization detectors, or a non-polarization detector and at least one polarization detector. The present invention can effectively achieve the polarization state analysis of the signal light, achieve the high-precision detection of the component to be detected in the longitudinal direction, and have advantages of good reliability, high stability and fast detection speed.

23 Claims, 4 Drawing Sheets

(58) Field of Classification Search
CPC ............... G01N 21/1717; G01N 21/86; G01N 21/8806; G01N 21/8851; G01N 21/952; G01N 2021/0112; G01N 2021/1725; G01N 2021/8861; G01N 2021/8874; G01N 2201/1042; G01N 21/88
See application file for complete search history.

(56) References Cited

U.S. PATENT DOCUMENTS

| | | | | |
|---|---|---|---|---|
| 6,636,302 | B2* | 10/2003 | Nikoonahad | G01N 21/94 356/237.2 |
| 6,753,961 | B1* | 6/2004 | Norton | G01J 3/447 356/364 |
| 8,854,628 | B2 | 10/2014 | Colonna de Lega et al. | |
| 10,379,445 | B2* | 8/2019 | Jak | G02B 5/1823 |
| 2006/0012872 | A1* | 1/2006 | Hayashi | G02B 21/0076 359/371 |
| 2008/0198380 | A1* | 8/2008 | Straaijer | G03F 7/70625 356/369 |
| 2013/0162980 | A1 | 6/2013 | Kim et al. | |
| 2017/0082425 | A1* | 3/2017 | Minekawa | G01B 11/30 |
| 2017/0146463 | A1* | 5/2017 | Honda | G01N 21/9501 |
| 2017/0184977 | A1* | 6/2017 | Jak | G03F 7/7085 |
| 2018/0067060 | A1 | 3/2018 | Nakao et al. | |
| 2019/0064677 | A1* | 2/2019 | Jak | G03F 7/70683 |
| 2020/0103355 | A1* | 4/2020 | Smith | G01B 9/02087 |
| 2022/0068681 | A1* | 3/2022 | Han | G02B 21/082 |

FOREIGN PATENT DOCUMENTS

| | | |
|---|---|---|
| CN | 102759533 A | 10/2012 |
| CN | 106153626 A | 11/2016 |
| CN | 207351398 U | 5/2018 |

OTHER PUBLICATIONS

Search Report for Application No. 11202100089P, dated Dec. 21, 2021.

* cited by examiner the first and the second polarized lights are generated by the light generating and modulating apparatus, and the first polarized light is reflected by the surface to be detected of the component to be detected to form the first echo light, and the second polarized light is reflected by the surface to be detected to form a second echo light, wherein there is a preset shear amount between the centers of the first and the second polarized lights — S801 the first and the second echo lights are interfered with each other through the light generating and modulating apparatus to form the signal light — S802 the light intensity information of the signal light along multiple different polarization directions, or the total light intensity information of the signal light and the light intensity information of the signal light along at least on polarization direction are acquired by the first detection apparatus — S803

FIG. 8

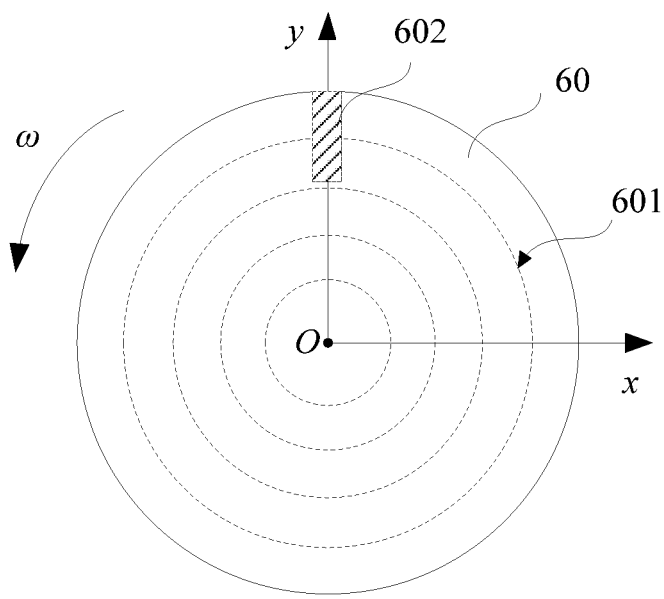

FIG. 9

DEVICE AND METHOD FOR DETECTING A SURFACE DEFECT USING INTERFERENCE BETWEEN POLARIZED LIGHTS

FIELD OF THE DISCLOSURE

The present invention relates to the technical field of optical detection, in particular, to a detection device and a detection method.

BACKGROUND

Detection of wafer defects refers to detecting whether there are defects such as grooves, particles, scratches, and defect locations. The detection of wafer defects is widely used, such as being a chip substrate, the presence of defects on the wafer may cause the expensive process above the wafer to fail, therefore, wafer producers often perform the defect detection to ensure product yield, and wafer users also need to determine the degree of defects of the wafers to ensure the product yield before using; the detection of wafer defects is also often used to test whether there is additional contamination in the semiconductor device.

The optical detection method has the characteristics of fast detection speed and no additional pollutions, and is widely used in component defect detection. However, the existing optical detection methods for detecting wafer defects, such as the light scattering method, have low detection accuracy in the wafer axial direction (the direction perpendicular to the wafer surface).

SUMMARY

In view of this, the purpose of the present invention is to provide a defect detection device and a detection method, which can effectively improve the technical problem of low detection accuracy in the wafer axis in the prior art.

In a first aspect, an embodiment of the present invention provides a defect detection device comprising: a light generating and modulating apparatus and a first detection apparatus. The light generating and modulating device is used to generate a first polarized light and a second polarized light, so that the first polarized light is reflected by a surface to be detected of a component to be detected to form a first echo light, and the second polarized light is reflected by the surface to be detected of the component to be detected to form a second echo light, and the first echo light and the second echo light are interfered to form a signal light, wherein there is a preset shear amount between the centers of the first polarized light and the second polarized light. The first detection device is used to acquire a first light intensity distribution information of the signal light, the first detection apparatus includes two or more detectors which are all polarization detectors, and polarization detection directions of different polarization detectors are different, or the two or more detectors include a non-polarization detector and at least one polarization detector.

Further, the first detection apparatus includes a first detection area used to scan the surface of the component to be detected; the first detection area includes a plurality of first detection cell areas, and an arrangement direction of the plurality of first detection cell areas is not perpendicular to a scanning direction of the first detection area on the surface of the component to be detected, and the detectors are used to separately detect the signal light reflected back from the surface to be detected corresponding to the different first detection cell areas.

Further, the arrangement direction of the plurality of first detection cell areas is parallel to the scanning direction of the first detection area on the surface of the component to be detected.

Further, the first detection area is strip-shaped, and an extension direction of the first detection area is perpendicular to the scanning direction of the first detection area on the surface of the component to be detected.

Further, when the surface to be detected of the component to be detected is circular, the first detection area extends along a radial direction of the surface of the component to be detected; the scanning direction of the first detection area on the surface of the component to be detected is perpendicular to the diameter direction of the surface to be detected.

Further, the first polarized light and the second polarized light are used to form a detection spot on the surface of the component to be detected; in the scanning direction of the first detection area on the surface of the component to be detected, a size of the detection spot is greater than or equal to a size of the first detection area.

Further, each of the polarization detectors is a polarization line detector, and the non-polarization detector is a line detector. The use of polarization detectors is beneficial to increase the inspection area of a single sampling and further improve the detection efficiency.

Further, when the number of the polarization detectors is two, the polarization detection directions of the two polarization detectors are perpendicular to each other.

Further, when the first detection apparatus includes three or more polarization detectors including a first polarization detector, a second polarization detector, and a third polarization detector, wherein an angle between the polarization detection directions of the third polarization detector and the first polarization detector is equal to 360°/n, n is an integer greater than or equal to 3 and n is the number of polarization detectors. Using more than three polarization detectors can obtain the phase information of the signal light more accurately, so as to obtain more accurate height detection results.

Further, the polarization detection directions of the first and the third polarization detectors are perpendicular to each other, and the angle between the polarization detection directions of the third and the second polarization detectors is 45°.

Further, when the first detection apparatus includes a non-polarization detector and at least one polarization detector, the number of the polarization detectors is two or more, wherein an angle between the polarization detection directions of the two polarization detectors is acute or obtuse.

Further, the light generating and modulating apparatus includes:
  a first light generating means used to generate the first polarized light and the second polarized light, there is a preset shear amount between the centers of the first and the second polarized lights, and the first polarized light is reflected by the surface of the component to be detected to form the first echo light, the second polarized light is reflected by the surface of the component to be detected to form the second echo light, and the first and the second echo lights are combined;
  a polarization controller used to modulate the polarization directions of the first and the second echo lights, so that the first and the second echo lights are interfered to form the signal light.

Further, the first light generating means includes a detection light generating module and a beam adjusting module, and the detection light generating module is coupled with the beam adjusting module;

The detection light generating module is used to generate first detection light;

the beam adjustment module is used to divide the first detection light into the first and the second polarized lights, and combine the first and the second echo lights.

Further, the detection light generating module comprises a first light source and a beam expanding shaping means, the first light source is used to generate the first detection light, and the beam expanding shaping means is used to control the shape and size of a spot on the surface of the component to be detected Further, the beam adjustment module includes a birefringent crystal.

Further, the first detection light is linearly polarized light, circularly polarized light, or elliptically polarized light. When the detection light is linearly polarized light, it is beneficial to simplify the subsequent demodulation process.

Further, the defect detection device further includes a first processing apparatus, and the first detection apparatus is electrically connected to the first processing apparatus. The first processing apparatus is used to acquire defect information of the component to be detected according to the first light intensity distribution information of the signal light.

Further, the first processing apparatus includes:
a signal demodulation module used to acquire initial information of the signal light according to the first light intensity distribution information of the signal light;
a noise acquisition module used to perform low-pass filtering processing on the first light intensity distribution information of the signal light to acquire noise information;
a target information acquisition module used to acquire defect information of the component to be detected according to the initial information and the noise information.

Further, the initial information includes initial phase information of the signal light, and the noise information comprises noise phase information. The target information acquisition module includes: a target phase acquisition sub-module used to perform difference processing on the initial phase information and the noise phase information to obtain target phase information; and a defect information acquisition sub-module used to acquire defect information of the component to be detected according to the target phase information. In this way, the phase noise contained in the signal light can be filtered, which is beneficial to improve the accuracy of the detection result.

Further, the target information acquisition module further comprises: a defect standard library including preset phase information and preset defect information for determining a corresponding relationship between the preset phase information and the preset defect information; the defect information acquisition sub-module is specifically used to search in the defect standard library according to the target phase information to acquire corresponding preset defect information, and obtain the detect information of the component to be detected.

Further, the defect detection device further includes: a second detection apparatus used to collect scattered light of the surface of the component to be detected, and acquire second light intensity distribution information of the scattered light; a second processing apparatus used to acquire first defection information of the component to be detected according to the first light intensity distribution information, and acquire second defection information of the component to be detected according to the second light intensity distribution information, and acquire target defect information of the component to be detected based on the first defect information and the second defect information. In this way, dual-channel detection can be realized, which is beneficial to improve the horizontal resolution on the basis of improving the longitudinal accuracy of defect detection.

Further, the above-mentioned defect detection device further includes: a second light generating means used to generate a second detection light, and cause the second detection light to be scattered by the surface of the component to be detected to form the scattered light.

In a second aspect, an embodiment of the present invention also provides a defect detection method, which is applied to the defect detection device provided in the above first aspect, and the method includes: generating a first polarized light and a second polarized light by the light generating and modulating apparatus, and the first polarized light is reflected by a surface to be detected of a component to be detected to form a first echo light, the second polarized light is reflected by a surface to be detected of a component to be detected to form a second echo light, wherein there is a preset shear amount between the centers of the first and the second polarized lights; causing the first and the second echo lights to interfere to form a signal light by the light generating and modulating apparatus; acquiring light intensity information of the signal light along a plurality of different polarization directions by the first detection apparatus, or acquiring total light intensity information of the signal light and light intensity information along at least one polarization direction.

Further, when the first detection apparatus includes a first detection area, and the first detection area includes a plurality of first detection cell areas; the method further includes: controlling the first and the second polarized lights to scan the surface to be detected, and repeating steps of forming the signal light and acquiring the light intensity information.

Further, the scanning direction of the first and the second polarized lights on the surface to be detected is the same as the arrangement direction of the plurality of first detection cell areas.

Further, the step of acquiring the first light intensity information including: sampling the light intensity information of the signal light by the first detection apparatus, and during time interval of two adjacent sampling, the scanning distance of the first detection area is the scanning step, and a distance between the centers of adjacent first detection cell areas is equal to an integer multiple of the scanning step.

Further, the distance between the centers of adjacent first detection cell areas is equal to the scanning step length.

Further, the step of controlling the scanning of the first and the second polarized lights on the surface to be detected includes: controlling the surface to be detected of the component to be detected to move in a direction opposite to the scanning direction.

Further, the step of controlling the surface to be detected of the component to be detected to move in a direction opposite to the scanning direction includes: controlling the component to be detected to rotate around a rotation axis of the component to be detected. The step of controlling the scanning of the first and the second polarized lights on the surface of the component to be detected further includes: after the surface to be detected rotates around the rotation axis one cycle, or during the surface to be detected rotates around the rotation axis, controlling the spot formed by the first and the second polarized lights on the component to be detected to move along a diameter direction of the component to be detected.

Further, when the light generating and modulating apparatus includes a first light source and a beam expanding shaping means, the step of generating the first and the second polarized lights includes: generating a first detection light by the first light source to form the first and second polarized lights based on the first detection light; adjusting the shape and the size of the spot on the surface to be detected of the component to be detected formed by the first and the second polarized lights by the beam expander and shaping means, so that in the scanning direction of the first detection area on the surface of the component to be detected, the size of the detection spot is greater than or equal to the size of the first detection area.

Further, light intensity information of the signal light along a plurality of different polarization directions acquired by the first detection apparatus, or total light intensity information of the signal light, and a light intensity information along at least one polarization direction are used as a first light intensity distribution information of the signal light, after acquiring the first light intensity distribution information, the method further includes: acquiring defect information of the component to be detected according to the first light intensity distribution information of the signal light.

Further, acquiring a defect information of the component to be detected according to the first light intensity distribution information of the signal light includes: acquiring initial information of the signal light according to the first light intensity distribution information; performing low-pass filtering processing on the first light intensity distribution information to acquire noise information; acquiring the defect information of the component to be detected according to the initial information and the noise information.

Further, the initial information includes initial phase information of the signal light, and the noise information includes a noise phase information, acquiring a first defect information of the component to be detected according to the initial information and the noise information includes: performing difference processing on the initial phase information and the noise phase information to acquire a target phase information; acquiring the defect information of the component to be detected according to the target phase information.

Further, acquiring the defect information of the component to be detected according to the target phase information includes: according to the target phase information, searching corresponding preset defect information in a pre-configured defect standard library to acquire first defect information of the surface of the component to be detected, wherein the defect standard library includes corresponding relationships between a plurality of preset phase information and corresponding preset defect information.

The embodiment of the present invention provides a detection device and a detection method. The detection device uses the signal light formed by the interference of the first and the second echo lights reflected on the surface of the component to be detected to obtain the first light intensity distribution information of the signal light corresponding to the sampling position on the component to be detected by the first detection device to obtain the phase distribution of the signal light according to the intensity distribution to obtain the defect distribution data of the component to be detected. Among them, the first detection apparatus includes more than two polarization detectors, or a non-polarization detector and at least one polarization detector. The present invention can effectively achieve the polarization state analysis of the signal light, achieve the high-precision detection of the component to be detected in the longitudinal direction, and have advantages of good reliability, high stability and fast detection speed.

To make the above-mentioned objects, features and advantages of the present invention more obvious and understandable, preferred embodiments are described below in conjunction with accompanying drawings in detail as follows.

BRIEF DESCRIPTION OF THE DRAWINGS

In order to illustrate the technical solutions of the embodiments of the present invention more clearly, the drawings needed in the embodiments will be briefly introduced below. It should be understood that the following drawings only show some embodiments of the present invention, therefore, it should not be regarded as a limitation of the scope. For one of ordinary skill in the art, other relevant drawings can be obtained based on these drawings without creative efforts.

FIG. 8 is a flowchart of a component defect detection method provided by a second embodiment of the present invention;

FIG. 9 is a view of a scanning trajectory of a wafer in an application scenario provided by a second embodiment of the present invention.

Figure 1:
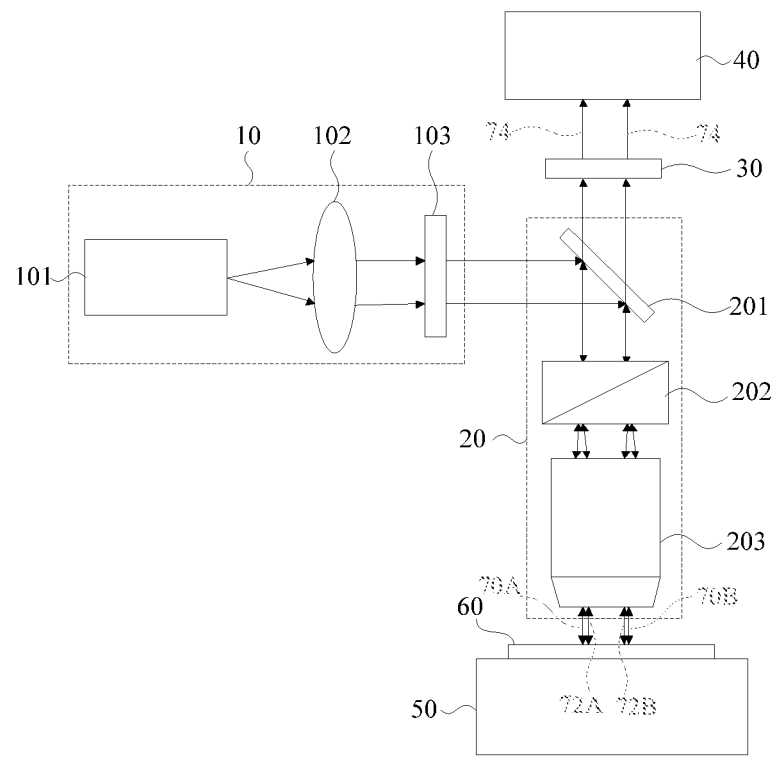
FIG. 1 is a structural view of a defect detection device provided by a first embodiment of the present invention.

In the drawings: defect detection devices 1, 2; detection light generating module 10; a first light source 101; a beam expanding shaping means 102, 74; a polarizer 103; a beam adjusting module 20; a first beam splitter 201; a birefringence crystal 202; an objective lens 203; a polarization controller 30; a first detection apparatus 40; a first detector 41; a second detector 42; a third detector 43; a fourth detector 44; a stage 50; a component to be detected a surface to be detected 600; scanning trajectory 601; a target area 602; a second light generating means 71; a second detection apparatus 72; a second beam splitter 73; a first filter a second filter 76; a converging lens 77.

DETAILED DESCRIPTION

In order to make the objectives, technical solutions and advantages of the embodiments of the present invention more clear, the technical solutions in the embodiments of the present invention with reference to the accompanying drawings in the embodiments of the present invention will be described clearly and completely below. Obviously, the described embodiments are some of the embodiments of the present invention, but not all of the embodiments. The components of the embodiments of the present invention generally described and illustrated in the drawings herein may be arranged and designed in various different configurations.

Thus, the following detailed description of the embodiments of the present invention provided in the accompanying drawings is not intended to limit the scope of the claimed invention, but merely represents selected embodiments of the present invention. Based on the embodiments of the present invention, all other embodiments obtained by those of ordinary skill in the art without creative efforts shall fall within the protection scope of the present invention.

It should be noted that similar reference numerals and letters indicate similar items in the following drawings. Thus, once some item is defined in one drawing, it does not need to be further defined or explained in subsequent drawings.

In the description of the present invention, it should be noted that the orientation or the positional relationship indicated by the terms "center", "upper", "lower", "left", "right", etc. is based on the orientation or the positional relationship shown in the drawings, or the position or positional relationship usually placed when the product of the invention is used, which merely for convenience of describing the present invention and simplifying the description, rather than indicating or implying that the device or element referred to must have a specific orientation and be structured and operated in the specific orientation, thus cannot be understood as a limitation of the present invention. In addition, the terms "first", "second", etc. are only used for distinguishing description, and cannot be understood as indicating or implying relative importance.

In the description of the present invention, it should also be noted that, unless otherwise clearly defined and limited, the terms "dispose", "connect", and "couple" should be interpreted broadly. For example, the connection can be a fixed connection, a detachable connection, or an integral connection; it can be a mechanical connection, or an electrical connection; it can be a direct connection or an indirect connection through an intermediate medium, and it can be communication between insides of two components. The coupling between two devices indicated that the light emitted by one of the devices enters the other device. For those of ordinary skill in the art, the specific meanings of the above-mentioned terms in the present invention can be understood in specific situations.

As shown in FIG. 1, a first embodiment of the present invention provides a defect detection device 1 comprising: a light generating and modulating apparatus and a first detection apparatus 40. It should be noted that a component to be detected 60 applicable to the defect detection device 1 may be a wafer or other components such as a coated optical component.

Wherein, the light generating and modulating apparatus is used to generate a first polarized light and a second polarized light, so that the first polarized light is reflected by a surface to be detected of the component to be detected 60 to form a first echo light, and the second polarized light is reflected by the surface of the component to be detected 60 to form a second echo light, and the first and second echo lights interfere to form a signal light. Wherein, there is a preset shear amount between the centers of the first polarized light and the second polarized light. Moreover, in an embodiment of the present invention, the propagation directions of the first polarized light and the second polarized light are also the same.

Specifically, the light generating and modulating apparatus may comprise: a first light generating means and a polarization controller 30, the first light generating means is coupled with the polarization controller 30, and the polarization controller 30 is coupled with the first detection apparatus 40. Among them, the first light generating means is used to generate the above-mentioned first and second polarized lights, so that the first polarized light is reflected by the surface to be detected of the component to be detected 60 to form the first echo light, and the second polarized light is reflected by the surface of the component to be detected 60 to form the second echo light, and the first and the second echo lights are combined to incident to the polarization controller 30. The polarization controller 30 is used to modulate the polarization directions of the first and the second echo lights, and the first and the second echo lights interfere to form a signal light.

In particular, as shown in FIG. 1, the first light generating means includes a detection light generating module 10 and a beam adjusting module 20, and the detection light generating module 10 and the beam adjusting module 20 are coupled. Wherein, the detection light generating module 10 is used to generate a first detection light. The beam adjustment module 20 is used to divide the first detection light into the first and the second polarized lights 70A, 70B, so that the first and the second polarized lights 70A and 70B are perpendicularly incident to the surface to be detected of the component to be detected 60, and the first echo light 72A formed by the reflection of the first polarized light 70A via the component to be detected 60 and the second echo light 72B formed by the reflection of the second polarized light 70A formed by the reflection of the component 60 to be detected are combined, so that the combined first echo light and second echo light are incident to the polarization controller 30. Specifically, the first detection light generated by the detection light generating module 10 enters the beam adjustment module 20, and then is processed by the beam device module to form the first polarized light 70A and the second polarized light which are incident to the surface to be detected of the component to be detected 60. The first echo light 72A formed by the reflection of the first polarized light 70A via the component to be detected 60 and the second echo light 72B formed by the reflection of the second polarized light 70B via the component to be detected 60 are combined by the beam adjustment module 20 and then enter the polarization controller 30.

In this embodiment, the first detection light may be monochromatic light, such as a wavelength of 532 nm, and the shape and size of the spot can be set according to specific needs and adapted to the detection area of the detection device. For example, a round spot or a rectangular spot can be used. As a selective implementation, the first detection light generated by the detection light generation module 10 is linearly polarized light. Of course, in other embodiments of the present invention, the first detection light may also be circularly polarized light or elliptically polarized light, which can be specifically set as required.

As a selective implementation, the detection light generating module 10 may comprise: a first light source 101, a beam expanding shaping means 102, and a polarizer 103. Among them, the first light source 101 is used to generate an initial beam. The beam expanding shaping means 102 is used to expand and shape the initial beam into a first beam of a preset size and a preset shape to adjust the size and shape of the spot formed by the first and the second polarized lights formed on the surface of the component to be detected 60. The polarizer 103 is used to adjust the polarization state of the first light beam to form a second light beam with a preset polarization state, thereby controlling the polarization states of the first and the second polarized lights 70A and 70B formed. Specifically, the initial light beam emitted from the first light source 101 is incident to the beam expanding shaping means 102, and the first light beam is formed after beam expansion and shaping by the beam expanding shaping means 102. The first light beam enters the polarizer 103, and the second light beam emitted from the polarizer 103 is the first detection light.

It should be noted that the defect detection device 1 provided in this embodiment does not require high monochromaticity of the first light source 101. Therefore, in this embodiment, the first light source 101 may be a laser, or the first light source 101 may also include an LED light source and a narrow-band filter, and the beam emitted from the LED light source is filtered by the narrow-band filter to form an initial beam.

The beam expanding shaping means 102 may be composed of one or more lenses and diaphragms, and the specific structure may be set according to the actually adopted first light source 101 and the required shape and size of the spot. In this embodiment, the shape of the spot after passing through the beam expanding shaping means 102 may be a linear spot or a rectangular spot to facilitate the detection of the line area of the component to be detected 60. Of course, in other embodiments of the present invention, the spot after passing through the beam expanding shaping means 102 may also have other shapes, such as a round spot or a square spot.

The polarizer 103 can be specifically disposed according to the polarization state requirements of the first and the second polarized lights 70A and 70B. In an embodiment of the present invention, the polarizer 103 can adjust the beam emitted by the beam expanding shaping means 102 as the linearly polarized light whose polarization direction and the optical axis of the polarizer 103 are angled 45 degrees. Of course, in other embodiments of the present invention, the polarizer 103 can adjust the beam emitted by the beam expanding shaping means 102 as the linearly polarized light in other directions, for example, the linearly polarized light with an angle of 30 degrees with the optical axis of the polarizer 103, the linearly polarized light with an angle of 60 degrees with the optical axis of the polarizer 103, etc., which can be specifically disposed as required.

In addition, in other embodiments of the present invention, when the shape and size of the spot formed by the first and the second polarized lights 70A and 70B corresponding to the initial light beam generated by the first light source 101 on the surface of the component to be detected 60 can meet the requirements, there is no need to expand and shape the initial light beam emitted by the first light source 101. At this time, the detection light generating module 10 may not include the aforementioned beam expanding shaping means 102, and only include the first light source 101 and the polarizing plate 103. Or, when the area of the spot formed by the first and the second polarized lights 70A and 70B corresponding to the initial light beam generated by the first light source 101 on the surface of the component to be detected 60 is larger, which can meet the requirements, such as the first light source 101 includes an LED light source and a narrow-band filter, there is no need to expand the initial light beam emitted, there is only need to shape the shape of the spot to the required shape, a this time, the detection light generating module 10 may include: a light source, a beam shaping component and a polarizer 103, wherein the beam shaping component may adopt an aperture to shape the shape of the spot of the initial light beam emitted by the first light source 101.

In an embodiment of the present invention, the first and the second polarized lights 70A and 70B may both be linearly polarized lights, and the polarization directions thereof are perpendicular to each other. At this time, the beam adjustment module 20 may specifically include a birefringent crystal 202 and an objective lens 203, as shown in FIG. 1.

The birefringent crystal 202 is used to divide the first detection light into two linearly polarized lights with a slight angle and polarization directions perpendicular to each other based on the birefringence effect. Due to the anisotropy of the crystal material, the angle between the two refracted lights is related to the propagation direction and polarization state of the light wave. In order to minimize the angle between the two refracted lights as much as possible, the transverse shear amount of the first and the second polarized lights is as small as possible, thereby improving the detection accuracy. As one embodiment, the birefringent crystal 202 may adopt a Nomarski prism. Of course, in other embodiments of the present invention, other suitable birefringent crystals 202 can also be used. It should be noted that when the angle between the vibration direction of the detection light and the optical axis is 45 degrees, the light intensities of the first and the second polarized lights 70A and 70B are equal, which is beneficial to simplify subsequent signal processing.

The objective lens 203 may be composed of one or more lenses, and is used to convert the two linearly polarized lights with a slight angle between the two propagation directions and the polarization directions perpendicular to each other emitted from the birefringent crystal 202 into two parallel lights with preset shear amounts which are the above-mentioned first and second polarized lights.

Of course, in order to arrange the optical path reasonably, the beam adjustment module 20 may include a first beam splitter 201 in addition to the birefringent crystal 202 and the objective lens 203, as shown in FIG. 1. In this embodiment, the first beam splitter 201 may be a half mirror.

As one embodiment, the first beam splitter 201, the birefringent crystal 202, and the objective lens 203 are sequentially disposed on the light propagation path between the detection light generating module 10 and the component to be detected 60. At this time, the first detection light generated by the detection light generating module 10 is incident to the surface of the birefringent crystal 202 via the first beam splitter 201, and is divided into two beams of linearly polarized lights with a slight angle and polarization directions perpendicular to each other, after the two beams of lights continues to pass through the objective lens 203, the above-mentioned first polarized light 70A and second polarized light are formed and incident to the surface of the component to be detected 60. The first polarized light 70A is reflected by the surface of the component to be detected 60 to form a first echo light 72A, and the second polarized light 70B is reflected by the surface of the component to be detected 60 to form a second echo light 72B, the first and second echo lights 72A and 72B return along the original path via the objective lens 203 to enter into the birefringent crystal 202 to recombine to be collinear with each other therein to be incident to the polarization controller 30 through the first beam splitter 201. It can be understood that after recombining the first echo light and the second echo light reflected by the component to be detected 60 to be collinear with each other, the respective polarization directions remain unchanged.

In this embodiment, the polarization controller 30 is used to adjust the polarization directions of the first and the second echo lights 72A and 72B described above. The first echo light 72A and the second echo light 72B interfere to form signal light 74. Specifically, the polarization controller 30 adjusts the polarization direction of the incident composite light, which can simplify the subsequent calculation complexity of obtaining the first and the second echo lights 72A and 72B through the first light intensity distribution information, and improve the detection efficiency and accuracy. In this embodiment, the polarization controller 30 may adopt a quarter-wave plate, a half-wave plate, or a combination of a quarter-wave plate and a half-wave plate.

For example, when the first and the second echo lights 72A and 72B reflected by the component to be detected 60 are linearly polarized light whose polarization directions are perpendicular to each other, and as the polarization controller 30 adopts a quarter wave plate, when the polarization direction of the composite light and the optical axis of the quarter wave plate are angled of 45 degrees, the first and the second echo lights 72A and 72B contained in the composite light are respectively converted into circularly polarized lights rotating in different directions, that is, the left-handed light and the right-handed light.

In this embodiment, the first detection apparatus 40 is used to obtain the first light intensity distribution information of the signal light formed by the light generating and modulating apparatus. Specifically, the first detection apparatus 40 includes more than two detectors.

Figure 2:
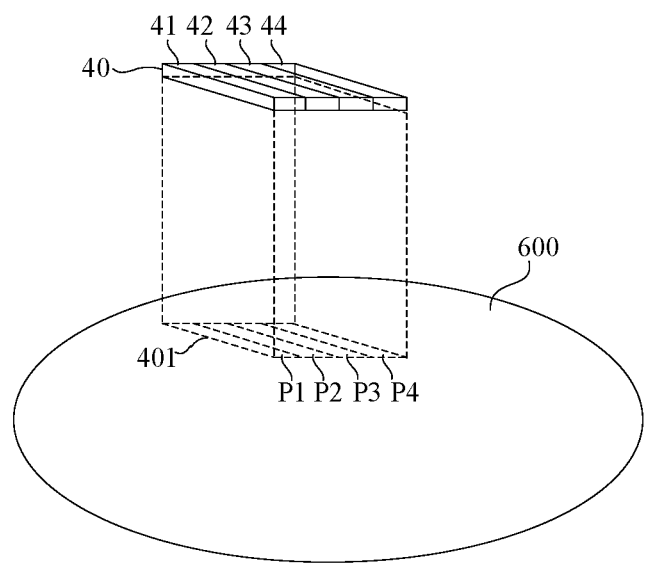
FIG. 2 is a schematic diagram of a first detection area of a first detection apparatus provided by the first embodiment of the present invention.

As shown in FIG. 2, the first detection apparatus 40 includes a first detection area. The first detection area refers to the work surface of the first detection apparatus 40, that is, the area where the photosensitive surface is projected on the surface to be detected of the component to be detected 60, that is, the area where the image imaged on the surface to be detected by the photosensitive surface via the optical device between the first detection apparatus 40 and the component to be detected 60. It should be noted that the projection relationship view shown in FIG. 2 is only for illustration, and other optical devices such as the objective lens 203, the light refraction crystal, the polarization controller 30, etc. are also disposed between the first detection apparatus 40 and the component to be detected 60. The signal light formed by the first and the second echo lights reflected from the surface to be detected in the first detection area can be received by the work surface of the first detection apparatus 40. Specifically, since the first detection apparatus 40 includes more than two detectors, the first detection area also includes a plurality of first detection cell areas, and one detector corresponds to one first detection cell area. At the same moment in the detection process, each detector detects the signal light formed by the first and the second echo lights reflected back from the surface to be detected in the different first detection cell areas.

For example, as shown in FIG. 2, it is assumed that the first detection apparatus 40 includes a first detector 41, a second detector 42, a third detector 43, and a fourth detector 44, and the first detector 41 corresponds to the first detection cell area P1, the second detector 42 corresponds to the first detection cell area P2, the third detector 43 corresponds to the first detection cell area P3, and the fourth detector 44 corresponds to the first detection cell area P4. At the same moment, the first detector 41 is used to detect the signal light formed by the first and the second echo lights reflected from the surface to be detected 600 in the first detection cell area P1, and the second detector 42 is used to detect the signal light formed by the first and the second echo lights reflected from the surface to be detected 600 in the second detection cell area P2, and the third detector 43 is used to detect the signal light formed by the first and the second echo lights reflected from the surface to be detected 600 in the third detection cell area P3, the fourth detector 44 is used to detect the signal light formed by the first and the second echo lights reflected by the surface to be detected 600 in the fourth detection cell area P4.

During detection, the first detection area 401 needs to be controlled to scan the surface to be detected 600 of the component to be detected 60, so that the signal light formed by the first and the second echo lights reflected back from the same inspection area of the surface to be detected 600 is sequentially received by each detector with the scanning time, that is, the signal light corresponding to the same inspection area of the surface 600 to be tested is scanned on the work surface of each detector. For example, when defects in some preset inspection area of the surface to be detected 600 of the components to be detected 60 need to be detected, it is necessary to control the first detection area 401 to scan the inspection area along the preset trajectory, so that each detector can obtain the signal light formed by the first and the second echo lights reflected back from the inspection area.

Specifically, the wat of controlling the scanning of the first detection area 401 on the surface to be detected of the component to be detected 60 may be: after building the optical path, the incident positions of the first and the second polarized lights and the position of the first detection apparatus 40 remain unchanged, the component to be detected 60 is controlled to move along the preset trajectory, so that the detection spot formed by the first and the second polarized lights on the surface to be detected of the component to be detected 60 scans the surface to be detected, that is, the first detection area 401 corresponding to the first detection apparatus 40 scans the surface to be detected. Of course, in other embodiments of the present invention, after building the optical path and placing the component to be detected 60, the component to be detected 60 can be kept still, and the incident positions of the first and the second polarized lights and the movement of the detection area 401 relative to the surface to be detected of the component to be detected 60 can be controlled synchronously so that the first detection area 401 scans the surface to be detected.

It can be understood that, during scanning, to enable each detector receive the signal light corresponding to the preset inspection area on the surface of the component to be detected 60, the arrangement direction of a plurality of first detection cell areas should not be perpendicular to the scanning direction of the first detection area 401 on the surface of the component to be detected 60. As an optional implementation, the arrangement direction of a plurality of first detection cell areas is parallel to the scanning direction of the first detection area 401 on the surface of the component to be detected 60, so that each detector can better receive the signal light corresponding to the preset inspection area during scanning to improve the detection efficiency.

Specifically, in this embodiment, the arrangement direction of the first detector 41, the second detector 42, the third detector 43, and the fourth detector 44 is the same as the arrangement direction of a plurality of first detection cell areas, the arrangement direction of the first detector 41, the second detector 42, the third detector 43 and the fourth detector 44 is parallel to the scanning direction of the first detection area 401 to the surface of the component 60.

To further improve the detection efficiency, as an optional implementation, the first detection area corresponding to the first detection apparatus 40 is strip-shaped, and a plurality of the first detection cell areas included in the first detection area are also all strip-shaped. The extension direction of the first detection area is perpendicular to the scanning direction of the first detection area to the surface of the component to be detected 60. In this way, it is possible to increase the component area that can be detected by scanning at one time, thereby improving the detection efficiency.

When the surface to be detected of the component to be detected 60 is circular, the first detection area extends along the radial direction of the surface of the component to be detected 60. At this time, the scanning direction of the first detection area on the surface to be detected of the component to be detected 60 is perpendicular to the diameter direction of the surface to be detected.

At detecting, the first polarized light and the second polarized light form a detection spot on the surface to be detected of the component to be detected 60, and the detection spot should cover or partially cover the first detection area corresponding to the first detection apparatus 40. As an optional implementation, the size of the detection spot is greater than or equal to the size of the first detection area in the scanning direction of the first detection area to the surface of the component to be detected 60. For example, when the first detection area is elongated, the shape of the detection spot is a rectangle, when the scanning direction of the surface of the component to be detected 60 to the first detection area is the same as the width direction of the detection spot, the width of the detection spot is greater than or equal to the width of the detection area.

The size of the detection spot which is greater than or equal to the size of the first detection area can obtain the light intensity of the signal light reflected by different first detection cell areas for the detectors included in the first detection apparatus 40 simultaneously, thereby improving the detection efficiency.

As an optional manner, the above two or more detectors are polarization detectors, and each polarization detector is used to detect the intensity of a specific polarization direction of the signal light, and the polarization detection directions of different polarization detectors are different. It should be noted that the polarization detection direction refers to the polarization direction of the light that can be detected by the polarization detector. Therefore, two or more polarization detectors can be used to obtain the intensity of the signal light emitted by the polarization controller 30 in different polarization directions. The phase value of the signal light can be further obtained according to the intensity distribution of the signal light detected by two or more polarization detectors in different polarization directions, so that the height distribution of the surface of the component to be detected 60 can be obtained according to the phase value of the signal light. It can be understood that the height difference between the irradiation positions of the first and the second polarized lights on the component to be detected 60 will change the phase value of the reflected light. Therefore, the height distribution of the surface of the component to be detected 60 will affect the phase distribution of signal light.

In this embodiment, a polarization detector can be configured by adding a micro-engraving array above the photodetector, the micro-engraving array is used to pass components of the signal light in a specific polarization direction, so that the signal light in the specific polarization direction is polarized from the micro-engraving array to be received by the detector. The vibration transmission directions of the micro-engraved arrays in different polarization detectors are different, so that different polarization detectors can obtain the intensities of signal light in different polarization directions.

The number of polarization detectors specifically included in the first detection apparatus 40 and the polarization detection direction of each polarization detector can be determined according to the component defect detection requirements. For example, the first detection apparatus 40 may include two polarization detectors, three polarization detectors, or four polarization detectors.

It should be noted that when the first detection apparatus 40 includes two polarization detectors, the polarization detection directions of the two polarization detectors are perpendicular to each other. At this time, it is impossible to distinguish whether the defect type is convex or concave (that is, the phase sign cannot be distinguished), and the defect type can be distinguished by using three or more polarization detectors. Therefore, in an embodiment of the present invention, the first detection apparatus 40 may include more than three polarization detectors. When the first detection apparatus 40 includes three or more polarization detectors, the three or more polarization detectors at least include a first polarization detector, a second polarization detector, and a third polarization detector. Wherein, the angle between the polarization detection directions of the third and the first polarization detectors is equal to 360°/n, n represents the number of polarization detectors, and n is an integer greater than or equal to 3. As an optional implementation, the polarization detection directions of the first and the third polarization detectors are perpendicular to each other, and the angle between the polarization detection directions of the third and the second polarization detectors is 45°, which is beneficial to simplify the subsequent phase demodulation.

Figure 3:
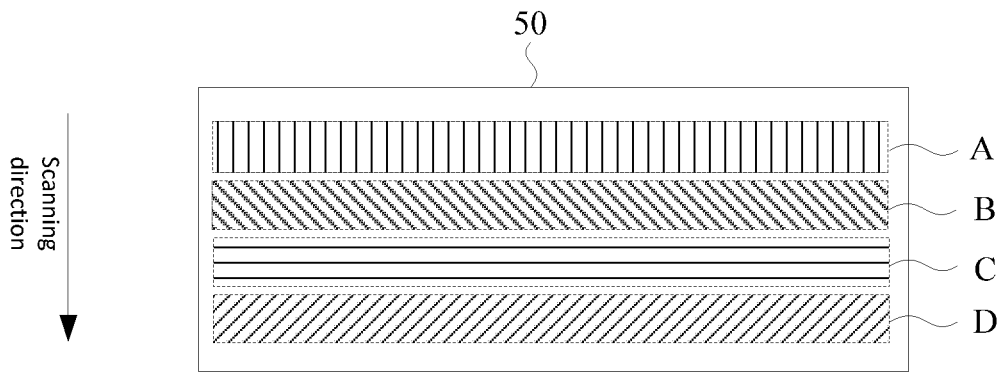
FIG. 3 is a structural view of a detection apparatus provided by the first embodiment of the present invention.

For example, in an application scenario of the present invention, the first detection apparatus 40 includes four polarization detectors whose polarization detection directions are degrees, 45 degrees, 90 degrees, and 135 degrees, as shown in FIG. 3.

To further improve the detection efficiency, in an embodiment of the present invention, each polarization detector adopts a polarization detector, that is, an array of polarization detectors is utilized to measure the intensities of the signal light in different polarization directions. This is beneficial to increase the detection area of a single sampling and further improve the detection efficiency. Correspondingly, in this embodiment, in the arrangement direction perpendicular to the first detection cell area, the size of the detection spot is greater than or equal to the size of the first detection area, which can increase the detection efficiency.

It can be understood that each polarization detector is composed of multiple polarization detection units. For example, when the shape of the work surface of a polarization detection unit is square, that is, the shape of the corresponding first detection cell area is also square, the work surface of a polarization detector is an area linearly arranged composed of a plurality of square areas. When the inspection area of the component to be detected 60 is circular, such as when the component to be detected 60 is a wafer, the work surface of the polarization detector extends along the radial direction of the wafer. Of course, in other embodiments of the present invention, each polarization detector may also be composed of a polarization detection unit. Specifically, one or more micro-engraving units can be added above a single photodetection unit to form a polarization detection unit, the micro-engraving unit is also used to pass the component of the signal light in a specific polarization direction which is received by the corresponding photodetection unit. It should be noted that the aforementioned micro-engraving array may be composed of multiple micro-engraving units.

As another optional manner, the above-mentioned first detection apparatus 40 includes a non-polarization detector and at least one polarization detector. It should be noted that a non-polarization detector refers to a detector that can obtain intensity information of a beam in any polarization direction; the polarization detector refers to a detector that can only obtain intensity information of a beam in a specific polarization direction. Among them, the number of polarization detectors can be one, assuming that the polarization detection direction of the polarization detector is α, the light intensity information of the signal light corresponding to an inspection area obtained by the polarization detector and the light intensity information of the signal light corresponding to the inspection area obtained by the non-polarization detector in the α polarization direction can obtain the light intensity information of the signal corresponding to the inspection area in the β polarization direction orthogonal to α polarization direction, so that the phase information of the signal light corresponding to the inspection area can be obtained according to the light intensity information of the signal light corresponding to the inspection area in the α polarization direction and the light intensity information of the signal light corresponding to the inspection area in the β polarization direction to get the defect situation of the inspection area. Of course, the number of the polarization detectors can also be two or more, at this time, when the angle between the polarization directions of the two polarization detectors is an acute or obtuse angle, it can be distinguished whether the defect type is convex or concave.

In addition, when the first detection apparatus 40 includes a non-polarization detector and at least one polarization detector, to improve the detection efficiency, each polarization detector is a polarization detector, and the non-polarization detector is also a line detector.

In addition, it can be understood that when the component to be detected 60 is detected, the component to be detected 60 needs to be placed on the stage 50. As an optional implementation, as shown in FIG. 1, the defect detection device 1 provided in the embodiment of the present invention further includes a stage 50 for placing the component to be detected 60. Further, in order to realize the line scanning of the component to be detected as a scanning manner, the stage 50 can be used not only to place the component to be detected 60, but also to drive the component to be detected 60 to move. Specifically, the stage may be an electric translation stage or a manual translation stage. Of course, in order to control the scanning process more accurately, it is preferable to use an electric translation stage. In an embodiment of the present invention, if any point on the placing plane of the stage 50 is taken as the origin, a three-dimensional rectangular coordinate system is established, where the Z axis direction is perpendicular to the placing plane, and the stage 50 can drive the component to be detected 60 to move in the X-axis, Y-axis, and Z-axis directions and can drive the component to be detected 60 to rotate on the XY plane. Of course, in other embodiments of the present invention, the stage 50 may also be an electric translation stage with six degrees of freedom.

It should be noted that in other embodiments of the present invention, the stage 50 may also be a stage 50 that is additionally configured and adapted to the defect detection device 1, that is, it is not included in the defect detection device 1.

In order to facilitate the understanding of the technical solution, the working process of the defect detection device 11 provided in this embodiment will be briefly described below.

The first and the second polarized lights with the same propagation direction and a preset shear amount generated by the first light generating means are incident on the surface to be detected of the component to be detected 60. The first and the second echo lights reflected by the component to be detected 60 return to the first light generating means, and after being combined by the light generating means, they enter the polarization controller 30, and interfere with each other after being processed by the polarization controller 30 and generate the signal light which is received by the first detection apparatus 40.

In this embodiment, the first detection area of the first detection apparatus 40 is enable to scan the component to be detected 60, that is, the signal light corresponding to the same preset inspection area on the component to be detected 60 are respectively detected by detectors included in the first detection apparatus 40, which can be realized by moving the component to be detected 60. Of course, in other embodiments of the present invention, it can also be implemented in other ways.

Specifically, when the component to be detected 60 moves along a preset trajectory, the first and the second polarized lights scan the component to be detected 60 along the preset trajectory, and the signal light corresponding to the same preset inspection area on the component to be detected 60 is received by each detector successively by the scanning time. In this embodiment, the preset trajectory can be set according to the shape of the inspection area of the component to be detected 60, for example, when the inspection area is a circular ring, the preset trajectory can be a circular trajectory, and when the inspection area is a square, the preset trajectory can be a straight trajectory.

At this time, in order to simultaneously enable the different detectors included in the first detection apparatus 40 to detect the intensity distribution of the signal light corresponding to the adjacent regions (different positions) of the component to be detected in the corresponding polarization direction more effectively, the arrangement direction of the working surfaces of the detectors included in a detection device 40 can be parallel to the scanning direction of the first and the second polarized lights on the component to be detected 60, that is, the arrangement direction of the first detection corresponding to the detectors is parallel to the scanning direction of the first and the second polarized lights on the component to be detected 60.

Further, since the detection is a scanning detection, to obtain a better detection result, the scanning speed and the sampling frequency of the first detection apparatus 40 need to be set. During the time interval between two adjacent samplings of the first detection apparatus 40, the scanning distance of the first detection area of the first detection apparatus that is, the moving distance of the detection spot formed by the first and the second polarized lights on the component to be detected 60 relative to the component to be detected is the scanning step length, and the distance between the centers of adjacent first detection cell areas should be adapted to the scanning step length. Specifically, the distance between the centers of adjacent first detection cell areas is equal to an integer multiple of the scanning step length.

To further improve the detection efficiency, as an implementation, the distance between the centers of adjacent first detection cell areas is equal to the scan step length. In this way, each detector included in the first detection apparatus 40 sequentially detects the intensity distribution of the signal light corresponding to the same inspection area of the component to be detected by the scanning time, thereby obtaining the intensity distribution of the signal light corresponding to the inspection area in different polarization directions. After the scanning is completed, the intensity distribution results of the signal light corresponding to each inspection area on the component to be detected 60 in different polarization directions can be obtained.

It can be understood that after the first light intensity distribution information of the signal light corresponding to the preset detection area of the component to be detected 60 is acquired by the first detection apparatus 40, it is necessary to further process the detection result of the first detection apparatus 40 to obtain the defect distribution data of the component to be detected 60. For the defect detection device 1 provided in the embodiment of the present invention, it may include a data processing apparatus for processing the data output from the first detection apparatus 40 to obtain the defect distribution data of the component to be detected 60, or the data output from the first detection apparatus 40 may be processed by additionally configured data processing apparatus.

Of course, in order to achieve online detection, as an optional embodiment, the defect detection device 1 may further include a first processing apparatus. The first processing apparatus is electrically connected with the first detection apparatus 40 to receive the first light intensity distribution information output from the first detection apparatus 40 online. The control apparatus is used to obtain defect information of the component to be detected 60 according to the first light intensity distribution information of the signal light.

Specifically, the first processing apparatus may be a computer, or may also be a data processing circuit module including a chip having data processing function, such as a DSP, ARM, or FPGA. Scanning detection will obtain the detection data stream output from the first detection apparatus 40, the first processing apparatus can process the detection data stream output from the first detection apparatus 40 by a preset phase demodulation algorithm to obtain the phase value of the signal light corresponding to each sampling position of the component to be detected 60. It should be understood that the phase of the signal light received by the first detection apparatus 40 will reflect the phase difference of the two coherent lights, since this phase difference is proportional to the height difference between the sampling positions corresponding to the two coherent lights, a slight fluctuation at the corresponding sampling position can be obtained according to the phase value of the signal light, that is, the defect information at the corresponding sampling position can be obtained.

Since the transverse shear amount Aa of the first and the second polarized lights incident to the component to be detected 60 can be less than the resolution limit of a general optical system, and the corresponding two transverse measurement positions are very close, the defect detection device 1 can achieve high detection accuracy in the longitudinal direction (in the direction perpendicular to the detected surface).

As shown below, the wafer will be taken as an example to explain how to process these data to obtain the defect distribution of the wafer surface. It can be understood that the detection data stream output from the first detection apparatus 40 contains the intensity distribution of the signal light corresponding to each sampling position on the wafer in different polarization directions. According to the intensity distribution of the signal light corresponding to each sampling position in different polarization directions, the phase value of the signal light corresponding to each sampling position is calculated, so as to obtain the phase distribution of the signal light corresponding to all sampling positions on the wafer surface, and then the defect distribution data of the wafer surface will be obtained according to the defect information at each sampling position calculated by the phase distribution.

For example, when the first detection apparatus 40 includes four polarization line detectors, and the polarization detection directions are respectively 0 degrees, 45 degrees, 90 degrees and 135 degrees, the signal light intensity received by the polarization line detector is taken as: $I_i(r,t)$, wherein i=1, 2, 3, 4 correspond to the light intensity in the polarization direction of 0 degree, 45 degree, 90 degree, and 135 degree respectively, r is the pixel information corresponding to the line detector, and t is the sampling time. Combining the specific scanning trajectory, (r, t) can be converted into the position distribution on the wafer. Assuming that the signal light phase corresponding to the target signal is represented as $\varphi(r,t)$, the phase of the signal light theoretically satisfies the following formula (1):

$$\varphi(r, t) = arctg\left[\frac{I_2(r, t) - I_4(r, t)}{I_1(r, t) - I_3(r, t)}\right] \quad (1)$$

According to the above formula, the phase distribution of the signal light detected by the first detection apparatus 40 can be obtained.

Figure 4:
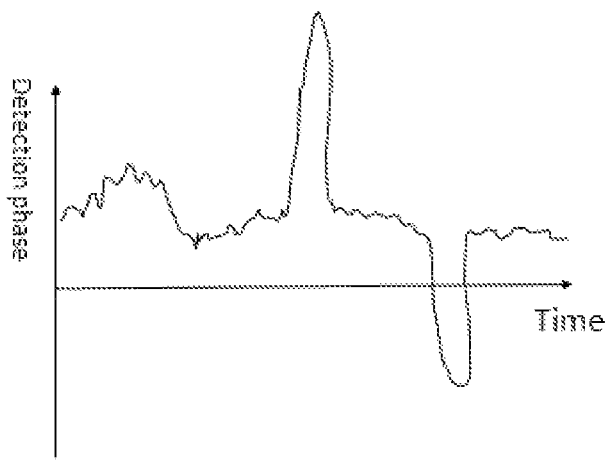
FIG. 4 is a view of the phase distribution of a detection result (including phase noise) provided by the first embodiment of the present invention.

However, the inventor discovers in the process of actually detecting the wafer by the detection device that although the wafer surface without any defects is theoretically flat and the signal light phase is equal to 0, there are many factors that will cause noise, such as the phase error of the optical system, the front polarization part of the detector having a certain depolarization ratio, the influence of the light source bandwidth, the change of the flatness of the wafer surface during the scanning process, etc., these factors will cause the obtained signal light to produce a position-dependent error, which causes the phase zero point obtained by direct calculation is no longer at the phase zero value, and has a slowly varying envelope that does not reflect the height change of the wafer surface. For example, FIG. 4 shows a view that the phase calculated based on an actual detection data changes over time, since there is a convex defect in the inspection area of the wafer, the phase is in the upward and downward convex shape which are corresponding to the rising edge and the falling edge of the defect respectively, but in the flat position, the phase still fluctuates. These fluctuations in the flat position are phase noise.

Therefore, in actual detection, the signal light phase $\varphi(r,t)$ should satisfy the following formula (2):

$$\varphi'(r, t) + \phi(r, t) = \left[\frac{I_2(r, t) - I_4(r, t)}{I_1(r, t) - I_3(r, t)}\right] \quad (2)$$

wherein $\varphi(r,t)$ presents the phase noise.

Based on the foregoing analysis, in an embodiment of the present invention, it is necessary to perform noise preprocessing to the first light intensity distribution information output from the first detection apparatus 40 to eliminate the foregoing noise. At this time, the first processing apparatus includes: a signal demodulation module, a noise acquisition module, and a target information acquisition module. Wherein the signal demodulation module is used to obtain the initial information of the signal light according to the first light intensity distribution information of the signal light; the noise acquisition module is used to perform low-pass filtering processing to the first light intensity distribution information of the signal light to obtain the noise information; the target information acquisition module is used to acquire the defect information of the component to be detected 60 according to the initial information and the noise information.

Wherein the foregoing initial information includes the initial phase information of the signal light. Specifically, a scene is taken as an example in which the first detection apparatus 40 includes four polarization detectors and the polarization detection directions are 0 degrees, 45 degrees, 90 degrees, and 135 degrees respectively, the initial phase information of the signal light can be calculated according to the above formula (1).

The aforementioned noise information includes the noise phase information. Specifically, the noise phase information can be obtained by performing low-pass filtering and performing phase demodulation on the first light intensity distribution information of the signal light.

Figure 5:
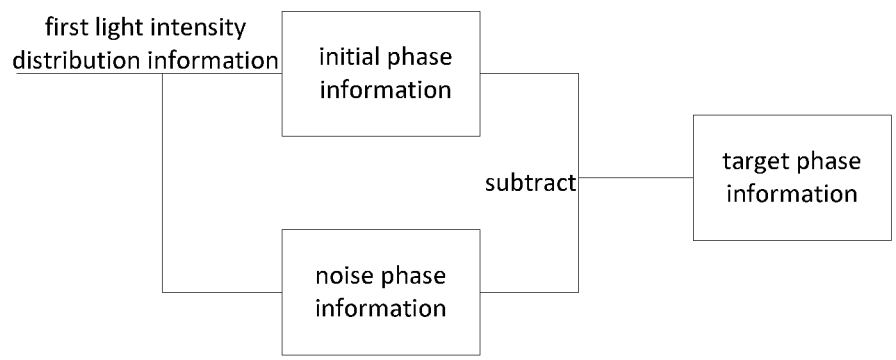
FIG. 5 is a view of a signal preprocessing process provided by the first embodiment of the present invention.
Figure 6:
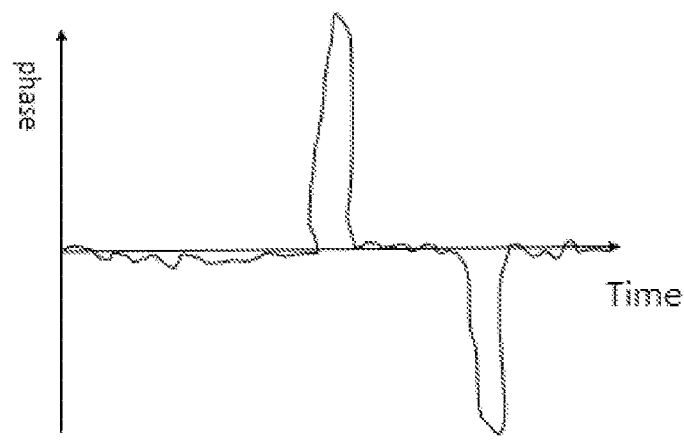
FIG. 6 is a view of the phase distribution of a detection result (filtering phase noise) provided by the first embodiment of the present invention.

Specifically, the aforementioned target information acquisition module includes: a target phase acquisition sub-module and a defect information acquisition sub-module. Among them, the target phase acquisition sub-module is used to perform difference processing on the initial phase information and the noise phase information to acquire the target phase information. That is, as shown in FIG. 5, the target phase information $\varphi'(r,t)$ may be obtained by subtracting the noise phase information which is $\varphi(r,t)$ of the above formula (2) from the obtained initial phase information. Comparing FIG. 4 and FIG. 6, it can be seen that the effect of noise on the obtained phase distribution result can be effectively removed by the above preprocessing, which is beneficial to improve the accuracy of the detection result. Further, the defect information at each sampling position can be calculated according to the phase distribution to obtain the defect distribution data on the wafer surface.

The defect information acquisition sub-module is used to acquire the defect information of the component to be detected 60 according to the target phase information. As an alternative, the height difference at the corresponding position on the surface of the component to be detected 60 can be calculated according to the target phase information of the signal light, so as to obtain the defect information of the component to be detected 60. As another alternative, the target information acquisition module may further include a defect standard library which includes a plurality of preset phase information and corresponding preset defect information, is used to determine the corresponding relationship between the phase information and the defect information. At this time, the above-mentioned defect information acquisition submodule is specifically used to search in the defect standard library according to the target phase information, to obtain the corresponding preset defect information, and to obtain the defect information of the component to be detected 60. That is, the defect information searched in the defect standard library is used as the defect information of the component to be detected 60 based on the target phase information.

For example, a scaling method may be adopted in advance to obtain the corresponding relationship between the signal light phase and the surface height of the component to be detected 60. The specific process can be: making a series of height standard plates (such as 10 nanometers, 20 nanometers, 30 nanometers, etc.), directly measuring their corresponding phase distributions, and obtaining the phase-height corresponding relationship curve according to the measuring data. In the actual measurement, the corresponding height information is found according to the obtained target phase value. This is beneficial to improve the height distribution of the surface to be detected more accurately, and to improve the detection efficiency by combine the simplified calculation process of defect information.

The modules included in the above first processing apparatus may be implemented by software codes. At this time, the above modules may be stored in the memory of the first processing apparatus. Alternatively, the modules included in the above first processing apparatus may also be implemented by hardware circuits such as integrated circuit chips.

Figure 7:
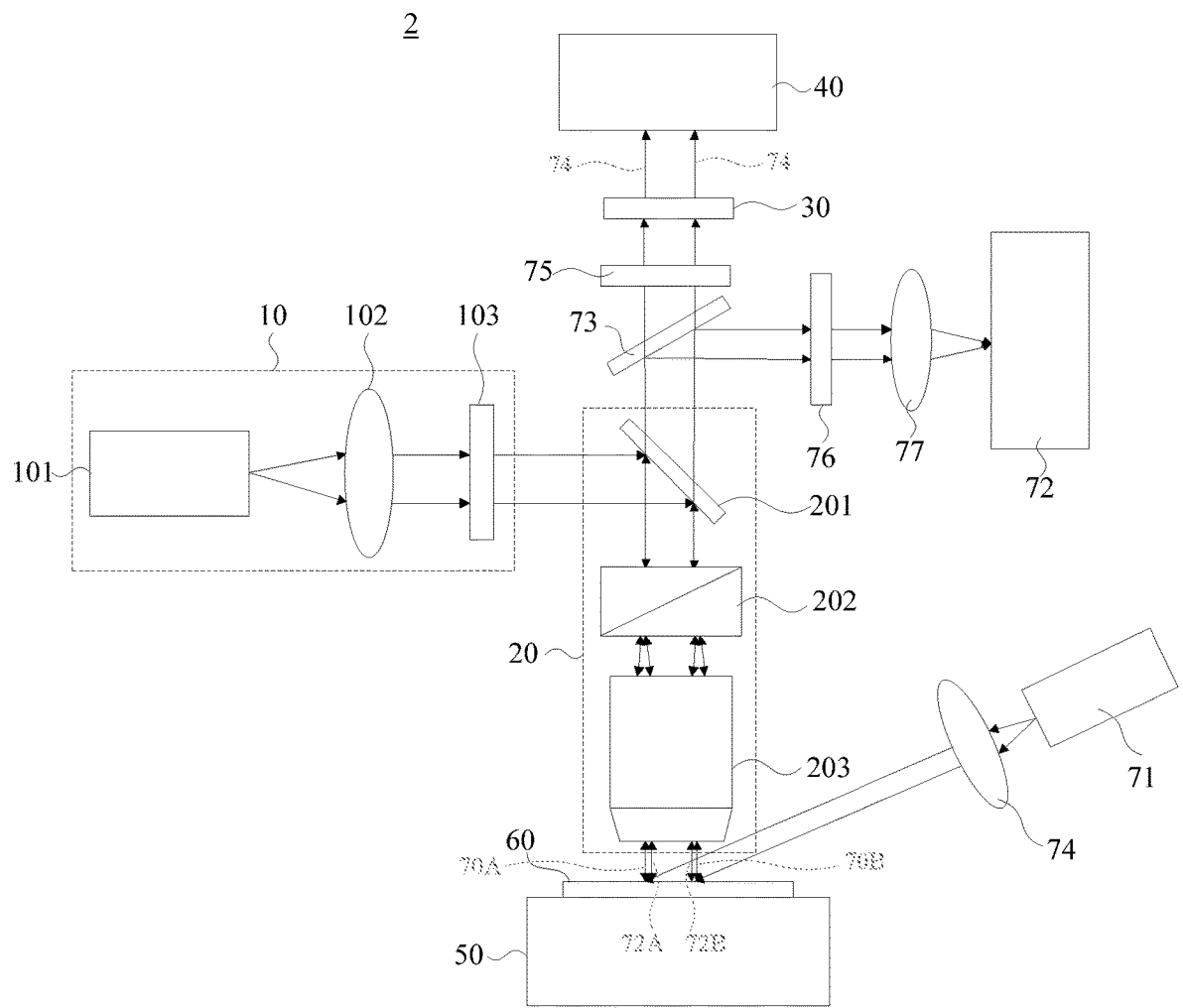
FIG. 7 is another structural view of the defect detection device provided by the first embodiment of the present invention.

As an optional embodiment, as shown in FIG. 7, the defect detection apparatus 2 provided in this embodiment includes, in addition to the above-mentioned light generating and modulating apparatus and the first detection apparatus 40, a second detecting apparatus 72. The second detection apparatus 72 is used to collect the scattered light on the surface of the component to be detected 60 and obtain the second light intensity distribution information of the scattered light. Therefore, on the basis of the detection channel based on the first detection apparatus 40, that is, the differential interferometry detection channel, the detection channel of scattered light is added to realize the combined detection of bright and dark fields.

The principle of the light scattering defect detection is: the laser is irradiated obliquely to a certain point on the surface of the component to be detected 60, when there is no defect on the surface of the component to be detected 60, the component to be detected 60 presents a mirror-like effect, and the incident light is reflected outward from the other side at the same angle; when there is a defect on the surface of the component to be detected 60, the incident light will be scattered with the defect, and the scattered light generated is transmitted in all directions above the surface of the component to be detected 60, the intensity of the scattered light is proportional to the size of the defect. Therefore, by detecting the scattered light above the surface of the component to be detected 60, the defect distribution and defect size information of the surface of the component to be detected 60 can be obtained.

The defect detection equipment 2 provided in this embodiment further includes a second light generating means 71. The second light generating means 71 is used to generate the second detection light and cause the second detection light to be scattered via the surface of the component to be detected 60 to form the scattered light. Specifically, the second detection light generated by the second light generating means 71 is obliquely incident on the preset inspection area on the surface of the component to be detected 60 at a preset angle, when there is a defect in the preset inspection area, the incident second detection light becomes scattered at the defect to form the scattered light.

In this embodiment, the defect detection device 2 further includes a reflection cup (not shown in the figure) for collecting the scattered light on the surface to be detected.

The spot of the second detection light generated by the second light generating means 71 on the component to be detected 60 is a point spot. The second detection apparatus 72 is a photodiode or a photomultiplier tube.

Since the emission direction of the scattered light is arbitrary, the position of the second detection apparatus 72 can be disposed as required. As an alternative, the scattered light detection channel can share the optical path with the signal light detection channel. For example, as shown in FIG. 7, the second detection light emitted by the second light generating means 71 is obliquely incident on the surface of the component to be detected 60 at a preset incident angle below the objective lens. Among them, the preset angle can be set according to actual needs, for example, the preset incident angle can be 72°.

It should be noted that the shape and size of the spot of the second detection light on the component to be detected 60 can be adjusted as required, for example, by a beam expanding shaping means 74 disposed on the light emission path of the second light generating means 71. In this embodiment, the spot of the second detection light on the component to be detected 60 can be adjusted as a point spot, so that the scattered light can be collected by the reflection cup and the interference of the scattered light in the adjacent area can be reduced. To distinguish from the signal light, the wavelength of the second detection light emitted by the second light generating means 71 may be different from the wavelength of the first detection light emitted by the first light generating means. It can be understood that the wavelengths of the first detection light, the first polarized light 70A, the second polarized light 70B, and the signal light 74 are the same. In addition, to reduce the interference of stray light on the first and the second echo lights, it is also necessary to add a second beam splitter 73 in the light receiving channel to divide the light received by the objective lens 203 into two parts for two-channel signal reception, as shown in FIG. 7. At the same time, a first filter 75 is added in front of the first detection apparatus 40 to filter the scattered light on the receiving channel. A second filter 76 is added in front of the second detection apparatus 72 to filter the interference light on the receiving channel, the scattered light is passed through the second filter 76 on the channel and is condensed to the second detection apparatus 72 via the condensing lens 77.

It should be noted that the position of the second beam splitter 73 can be disposed as required, for example, can be disposed on the light propagation path between the first beam splitter 201 and the polarization controller 30, or can also be disposed on the light propagation path between the objective lens 203 and the birefringent crystal 202.

In this embodiment, detection spots on the surface of the component to be detected respectively formed by the first light generating means and the second light generating means 71 are detected by the signal light formed by the reflection of the surface of the component to be detected 60 by the first detection apparatus 40 accordingly. In other words, the differential interferometry detection channel and the scattered light detection channel are respectively controlled to detect the component to be detected 60.

Specifically, based on the above definition of the first detection area, the second detection apparatus 72 also includes a second detection area. The second detection apparatus 72 is used to obtain scattered light scattered on the surface of the component to be detected 60 in the second detection area.

The way of controlling the scattered light detection channel to detect the component to be detected 60 may be: dividing the component to be detected 60 into a plurality of inspection areas, controlling the second detection light to form the spot on the surface of the component to be detected 60 sequentially and controlling the second detection area to cover each inspection area sequentially, obtaining the scattered light formed by each inspection area on the surface of the component to be detected 60 sequentially.

While the second detection area is scanning along the diameter of the component to be detected, the second detection area also moves along the diameter direction of the component to be detected.

In addition, because of adding the scattered light detection channel, unlike the first processing apparatus described above, this embodiment also includes a second processing apparatus. The first detection apparatus 40 and the second detection apparatus 72 are both electrically connected to the second processing apparatus. The second processing apparatus is used to obtain the first defect information of the component to be detected 60 according to the first light intensity distribution information of the signal light obtained by the first detection apparatus 40, and obtain the second defect information of the component to be detected 60 according to the second light intensity distribution information of the scattered light obtained by the second detection apparatus 72, and obtain the target defect information of the component to be detected 60 based on the first defect information and the second defect information. Specifically, the second processing apparatus may also be a computer, or may also be a data processing circuit module including a chip with data processing functions such as DSP, ARM, or FPGA.

Among them, the process of obtaining the first defect information of the component to be detected 60 according to the first light intensity distribution information can reference the process of the above-mentioned first processing apparatus, which will not be repeated here.

The first defect information includes first defect location information and first defect size information, and the second defect information includes second defect location information and second defect size information. The specific process of obtaining the target defect information of the component to be detected 60 obtained based on the first defect information and the second defect information may be: performing defect accumulation on the first defect information and the second defect information, and performing common defect incorporation judgment to obtain the defect information of the component to be detected 60. Since there may be position errors during defect detection, the positions of the same defect obtained by different channels are slightly different, the defect judgment is required when performing defect incorporation. The specific defect judgment method is as follows: first traversing all the defects obtained in a single channel, taking out any defect obtained in a single channel (such as a light scattering method channel) as the current defect; calculating the distance between the current defect and each defect obtained from another channel (such as a differential interferometry channel) sequentially, determining whether the distance is less than the preset threshold value, if the distance is less than the preset threshold value, then the distance corresponding to the two defects is considered to be the same defect, and incorporating the two defects into one. The next defect obtained by the single channel is regarded as the current defect, and the processes of the above distance calculation and distance judgment are repeated until the judgments of all defects obtained by the single channel are completed.

Among them, the selection of the preset threshold can be measured through multiple experiments. For example, different thresholds can be selected for incorporating judgment, and the value of the incorporating result closest to the actual situation is taken as the preset threshold.

In summary, the defect detection device provided by the embodiments of the present invention realizes the high precision detection of the defect of the component to be detected 60 in the longitudinal direction (perpendicular to the surface to be detected) by the polarization state determination of the signal light 72 based on the first detection apparatus 40, performing component defect detection in the way of line scanning to obtain the phase distribution of the signal light, and obtaining the optical path difference of the two coherent lights according to the phase distribution of the signal light to obtain the slight undulations of the surface of the component to be detected 60, such as high-precision detection of pit-type defects, and the defect detection device owns good reliability, high stability and fast detection speed. In addition, a phase noise filtering method proposed according to the rules of noise in wafer detection improves the signal-to-noise ratio of the detection results, which further improves the accuracy of the defect detection.

Further, by adding a scattered light detection channel on the basis of the differential interferometry detection channel, the combined detection of bright and dark fields is realized, which not only improves the defect detection accuracy in the longitudinal direction (perpendicular to the detected surface), but also improved the horizontal resolution.

In addition, an embodiment of the present invention also proposes a defect detection method which can be applied to the defect detection device proposed in the above-mentioned first embodiment. Of course, in addition to the aforementioned defect detection device, the defect detection method can also be applied to other applicable defect detection devices. As shown in FIG. 8, the method includes:

Step S801, the first and the second polarized lights are generated by the light generating and modulating apparatus, and the first polarized light is reflected by the surface to be detected of the component to be detected 60 to form the first echo light, and the second polarized light is reflected by the surface to be detected to form a second echo light, wherein there is a preset shear amount between the centers of the first and the second polarized lights;

Step S802, the first and the second echo lights are interfered with each other through the light generating and modulating apparatus to form the signal light;

Step S803, the light intensity information of the signal light along multiple different polarization directions or the total light intensity information of the signal light and the light intensity information of the signal light along at least on polarization direction are acquired by the first detection apparatus 40.

It should be noted that when the first detection apparatus 40 includes two or more polarization detectors, and the polarization detection directions of different polarization detectors are different, the light intensity information of the signal light along multiple different polarization directions can be obtained. When the first detection apparatus 40 includes a non-polarization detector and at least one polarization detector, the total light intensity information of the signal light and the light intensity information along at least one polarization direction can be obtained. Among them, the total light intensity information refers to the light intensity information of the signal light obtained by the non-polarization detector. In this embodiment, the light intensity information of the signal light along multiple different polarization directions, or the total light intensity information of the signal light and the light intensity information along at least one polarization direction are used as the first light intensity distribution information of the signal light.

Specifically, since the first detection apparatus 40 includes a first detection area, and the first detection area includes a plurality of first detection cell areas, to obtain the first light intensity information of the signal light corresponding to a certain inspection area of the surface of the component to be detected 60, each detector included in the first detection apparatus 40 needs to receive the signal light corresponding to the inspection area, the first detection needs to scan the component to be detected 60, so that each first detection unit area cover the inspection area sequentially over the scanning time.

As an optional way, the method further includes: controlling the first and the second polarized lights to scan on the component to be detected, and repeating the above steps S802 and S803. That is, in the process of scanning the component to be detected by the spot formed by the first and the second polarized lights on the component to be detected, each scanning area will successively reflect the first and the second echo lights to form the signal light, meanwhile the signal light corresponding to each scanning area will be sequentially received by the first detection apparatus 40 over the scanning time to obtain the first light intensity distribution information.

Specifically, the incident positions of the first and the second polarized lights and the position of the first detection apparatus 40 can be kept unchanged, and the component to be detected 60 is controlled by the electric stage 50 or other actuators to move along the preset trajectory, so that the detection spot formed by the first and the second polarized lights on the surface of the component to be detected 60 scans the component to be detected 60, and meanwhile, the first detection area of the first detection apparatus 40 follows the detection spot to scan the component to be detected 60.

As an optional implementation, the scanning directions of the first and the second polarized lights on the component to be detected is the same as the arrangement direction of the plurality of first detection unit regions.

As an optional implementation, the step of acquiring the first light intensity information includes: sampling the light intensity of the signal light by the first detection apparatus 40, and During the time interval between two adjacent samplings, the scanning distance of the first detection area is a scanning step, and the distance between the centers of adjacent first detection cell areas is equal to an integer multiple of the scanning step.

As an optional implementation, the distance between the centers of adjacent first detection cell areas is equal to the scan step length.

As an optional implementation, the step of controlling the scanning of the first and the second polarized lights on the component to be detected includes: controlling the surface to be detected of the component to be detected 60 to move along the opposite direction of the preset scanning direction. That is, the aforementioned preset trajectory is opposite to the scanning direction.

As an optional implementation, when the light generating and modulating apparatus includes the first light source 101 and the beam expanding shaping means 102, the step of generating the first and the second polarized lights may include: generating the first detection light by the first light source 101 to form the first and second polarized lights based on the first detection light; adjusting the shape and size of the spot formed by the first and second polarized lights on the surface to be detected of the component to be detected 60 by the beam expanding shaping means 102, so that the size of the detection spot is greater than or equal to the size of the first detection area in the direction of scanning the surface of the component to be detected along the first detection area.

As an optional implementation, the step of controlling the surface to be detected of the component to be detected 60 to move in a direction opposite to the scanning direction includes:
controlling the component to be detected 60 to rotate around a rotation axis perpendicular to the surface to be detected;

The step of controlling the scanning of the first and the second polarized lights on the surface of the component to be detected 60 further includes: after the surface to be detected rotates one circle around the rotation axis or during the surface to be detected rotates around the rotation axis, controlling the spot formed by the first and the second polarized lights on the component to be detected to move along the diameter direction of the component to be detected.

In this embodiment, after the component to be detected rotates one circle around the rotation axis, the spot formed by the first and the second polarized lights on the component to be detected is controlled to move along the diameter direction of the component to be detected. This can make the obtained signal light more stable, thereby increasing the detection accuracy.

In other embodiments, during the component to be detected rotates around the rotation axis, the spot formed by the first and the second polarized lights on the component to be detected is controlled to move along the diameter direction of the component to be detected, which can increase the detection efficiency.

In actual detection, in order to facilitate scanning control, the component to be detected 60 can be placed on the stage 50, and the component to be detected 60 is driven by the stage 50 to move along the preset trajectory. For example, in a specific application scenario, a wafer is taken as an example to describe the process of controlling the wafer to move along the preset trajectory.

Before detection, the wafer is placed on the stage 50 to make the center O of the wafer coincide with the rotation center of the stage 50, the relative position of the first detection apparatus 40 and the wafer is adjusted so that the first extension direction of the detection area is parallel to the radius of the wafer. The direction of the Nomarski prism is adjusted so that the deviation direction of the two linearly polarized lights generated by the splitting of the Nomarski prism is perpendicular to the extension direction of the first detection area. For example, taking the wafer center O as the origin, a rectangular coordinate system as shown in FIG. 9 is established, and the extension direction of the first detection area is parallel to the y-axis direction in FIG. 9, then the deviation direction of the two linearly polarized lights with slight angles emitted by the Nomarski prism is parallel to the x-axis direction in FIG. 9, so that the first and the second polarized lights emitted by the objective lens have a preset shear amount along the x-axis direction in FIG. 9, then The defect detection device can detect protrusions or depressions on the surface of the component to be detected 60 along the x-axis. In other embodiments, the first and the second polarized lights may also have a preset shearing amount along the y-axis direction in FIG. 9, or the direction of the preset shear amount of the first and the second polarized lights has an acute angle with the x-axis.

During the detection, the wafer can be driven to move by controlling the stage 50, so as to detect different positions of the wafer surface, and finally to realize the entire wafer surface defect detection. Specifically, when the scanning control process is: after controlling the component to be detected to rotate one circle around the rotation axis, and then controlling the spot formed by the first and the second polarized lights on the component to be detected to move along the diameter direction of the component to be detected, the wafer can be divided into a plurality of annular areas, and each annular area corresponds to one scanning trajectory 601, and the multiple scanning trajectories 601 are distributed in concentric circles, as shown in FIG. 9. It should be noted that, to avoid missed detection, the two adjacent annular areas should be connected or at least one or two pixels (relative to the detector) overlap area. Each annular area includes a plurality of target areas 602, and the shape and size of the target area 602 are determined by the shape and size of the first detection area corresponding to the first detection apparatus 40. First, moving the stage 50 so that the spot emitted by the objective lens covers any target area 602 in the outermost annular area of the wafer, at this time, the signal light corresponding to the target area 602 is received by the first detection apparatus 40. Then, the stage 50 is controlled to drive the wafer to rotate one cycle, so that the spot sequentially passes through other target areas 602 of the outermost annular area of the wafer according to the preset scanning trajectory 601, that is, the outermost annular area of the wafer is scanned. After the scanning is completed, each detector included in the first detection apparatus 40 can obtain the signal light detection data corresponding to the outermost annular area of the wafer.

For example, when the first detection apparatus 40 includes four polarization detectors, namely, a polarization detector A, a polarization detector B, a polarization detector C, and a polarization detector D, each target area 602 can be divided into four adjacent sub-areas, one sub-area corresponds to the first detection cell area of a polarization detector, that is, the signal light reflected by each sub-area is received by the corresponding polarization detector. For example, assuming that the target area 602 includes a first sub-area, a second sub-area, a third sub-area, and a fourth sub-area, during the process of controlling the component to be detected to rotate one cycle around the rotation axis, if at the moment, the current target area 602 is the first sub-area which corresponds to the first detection cell area of the polarization detector A, the second sub-area corresponds to the first detection cell area of the polarization detector B, the third sub-area corresponds to the first detection cell area of the polarization detector C, the fourth sub-area corresponds to the first detection cell area of the polarization detector D. Then at the next scanning moment, the second sub-area in the current target area 602 corresponds to the first detection cell area of the polarization detector A, the third sub-area corresponds to the first detection cell area of the polarization detector B, and the fourth sub-area corresponds to the first detection cell area of the polarization detector C, the first sub-area in the next target area 602 corresponds to the first detection cell area of the polarization detector D, and so on, until the scanning of the current annular area is completed. During this process, the polarization detector A, the polarization detector B, the polarization detector C, and the polarization detector D can sequentially obtain the signal light corresponding to the current circular area over the scanning time.

Controlling the surface to be detected to rotate one cycle around the rotation axis, so that after the spots formed by the first and the second polarized lights on the component to be detected scanning the outermost annular area of the wafer surface, and then controlling the stage 50 to drive the wafer along its diameter direction to move, so that the spot formed by the first and the second polarized lights on the wafer surface moves in a direction opposite to the wafer moving direction, and the spot covers the target area in the next annular area of the wafer surface. Then the stage 50 is controlled to drive the wafer to rotate one circle around the rotating axis to complete the scanning of the annular area, and so on, until the detection of the entire wafer surface is completed.

Synthesizing the signal detection speed and the detection lateral resolution, the embodiment of the present invention adopts the line scanning detection, considering that the spot emitted by the general light source is a circular spot, and to shape the spot into a line beam requires additional beam shaping, but the intensity requirement of the detection device is low, the circular spot illumination plus line detector can be adopted to detect the surface line area of the component. Of course, a line light source adapted to the detection area of the line detector can also be adopted for detection.

As an optional implementation, after the above step S803 is performed, the method further includes: acquiring, by the first processing apparatus, the defect information of the component to be detected 60 according to the first light intensity distribution information of the signal light.

As an optional implementation, acquiring the defect information of the component to be detected 60 according to the first light intensity distribution information of the signal light includes: acquiring the initial information of the signal light according to the first light intensity distribution information; performing the low-pass filter process on the first light intensity distribution information to obtain the noise information; acquiring the defect information of the component to be detected 60 according to the initial information and the noise information.

As an optional implementation, the initial information includes initial phase information of signal light, and the noise information includes noise phase information. Obtaining the first defect information of the component to be detected 60 according to the initial information and the noise information includes: performing the difference processing on the initial phase information and the noise phase information to obtain the target phase information; acquiring the phase information; acquiring the defect information of the component to be detected 60 according to the target phase information.

As an optional implementation, acquiring the defect information of the component to be detected 60 according to the target phase information includes: searching corresponding preset information in a pre-configured defect standard library according to the target phase information to obtain the first defect information on the surface of the component to be detected 60, wherein the defect standard library includes the corresponding relationship between a plurality of preset phase information and corresponding preset defect information.

In another embodiment of the present invention, the defect detection device may also be a dual-channel defect detection device, that is, as described in the above first embodiment, which includes a scattered light detection channel and a differential interferometry detection channel. Specifically, as shown in FIG. 7, the defect detection equipment includes a second light generating means 71, a second detecting apparatus 72, and a second processing apparatus.

At this time, the above-mentioned defect detection method includes: generating the first and the second polarized lights by the first light generating means to scan the surface to be detected, and obtaining the first light intensity distribution information of the surface to be detected by the first detection apparatus 40; after or before the first light generating means generates the first and the second polarized lights to scan the surface to be detected, generating the second detection light by the second light generating means 71 to scan the surface to be detected, and acquiring the second light intensity distribution information of the scattered light on the surface to be detected by the second detection apparatus 72 according to the first light intensity distribution information, obtaining the first defect information of the component to be detected 60 according to the first light intensity distribution information, and obtaining the second defect information of the component to be detected 60 according to the second light intensity distribution, and obtaining the target defect information of the component to be detected 60 based on the first defect information and the second defect information.

Those skilled in the art can clearly understand that, for the convenience and conciseness of the description, the specific implementation process of the above-described method can refer to the corresponding process in the above-mentioned apparatus embodiment, which will not be repeated here.

The above are only specific embodiments of the present invention, but the protection scope of the present invention is not limited thereto, any person skilled in the art can easily think of alternatives or changes within the technical scope disclosed by the present invention, which shall be covered within the protection scope of the present invention. Therefore, the protection scope of the present invention should be subject to the protection scope of the claims.

What is claimed is:

1. A detection device, comprising:
    a light generator coupled to a light adjustment module wherein the light generator generates a first polarized light, wherein the first polarized light is reflected by a surface to be detected of a component to form a first echo light, the first echo light forming a component of a signal light; and
    a first light detector that acquires a first light intensity distribution information of the signal light, the first light detector including two or more polarization detectors with the polarization detection directions of two different ones of the polarization detectors being different, or the two or more polarization detectors including a non-polarization detector and at least one polarization detector.

2. The detection device of claim 1, wherein the light adjustment module generates a second polarized light, the second polarized light being reflected by the surface to be detected to form a second echo light, and wherein the first echo light and the second echo light are interfered to form the signal light, and wherein there is a preset shear amount between the centers of the first polarized light and the second polarized light.

3. The detection device of claim 2, wherein the first polarized light and the second polarized light form a detection spot on the surface of the component; wherein, in the scanning direction of the first detection area on the surface of the component, a size of the detection spot is greater than or equal to a size of the first detection area.

4. The detection device of claim 1, wherein the first light detector includes a first detection area used to scan the surface of the component; the first detection area including a plurality of first detection cell areas, wherein an arrangement direction of the plurality of first detection cell areas is not perpendicular to a scanning direction of the first detection area on the surface of the component to be detected, and the polarization detectors separately detect the signal light reflected back from the surface to be detected corresponding to the different first detection cell areas.

5. The detection device of claim 4, wherein the arrangement direction of the plurality of first detection cell areas is parallel to the scanning direction of the first detection area on the surface of the component.

6. The detection device of claim 4, wherein the first detection area is strip-shaped, and an extension direction of the first detection area is perpendicular to the scanning direction of the first detection area on the surface of the component.

7. The detection device of claim 1, wherein each of the polarization detectors is a polarization line detector and the non-polarization detector is a line detector, or the polarization detection directions of the two polarization detectors are perpendicular to each other when the number of the polarization detectors is two.

8. The detection device of claim 1, wherein the first detection apparatus includes three or more polarization detectors including a first polarization detector, a second polarization detector, and a third polarization detector, and wherein an angle between the polarization detection directions of the third polarization detector and the first polarization detector is equal to 360°/n, wherein n is an integer greater than or equal to 3 and n is the number of polarization detectors.

9. The detection device of claim 1, wherein the first detection apparatus includes a non-polarization detector and at least one polarization detector, wherein the number of the polarization detectors is two or more, and wherein an angle between the polarization detection directions of the two polarization detectors is acute or obtuse.

10. The detection device of claim 1, wherein the light adjustment module comprises a first light adjusting means that generates the first polarized light and the second polarized light such that there is a preset shear amount between the centers of the first polarized light and the second polarized light, and the first polarized light is reflected by the surface of the component to form the first echo light, the second polarized light is reflected by the surface of the component to form the second echo light, and the first and the second echo lights are combined;
and further including a polarization controller that modulates the polarization directions of the first echo light and the second echo light, so that the first echo light and the second echo light are interfered to form the signal light.

11. The detection device of claim 1, further including a first processor, wherein the first processor acquires defect information of the component according to the first light intensity distribution information of the signal light.

12. The detection device of claim 11, wherein the first processor includes:
a signal demodulation module that acquires initial information of the signal light according to the first light intensity distribution information of the signal light;
a noise acquisition module that performs low-pass filtering on the first light intensity distribution information of the signal light to acquire noise information;
a target information acquisition module that acquires defect information of the component according to the initial information and the noise information; wherein the initial information includes initial phase information of the signal light, and the noise information includes noise phase information,
wherein the target information acquisition module includes:
a target phase acquisition sub-module that performs difference processing on the initial phase information and the noise phase information to obtain target phase information; and
a defect information acquisition sub-module that acquires defect information of the component to be detected according to the target phase information.

13. The detection device of claim 12, wherein the target information acquisition module further comprises: a defect standard library including preset phase information and preset defect information for determining a corresponding relationship between the preset phase information and the preset defect information; wherein the defect information acquisition sub-module searches in the defect standard library according to the target phase information to acquire corresponding preset defect information, and to obtain the detect information of the component.

14. A detection method, comprising:
generating a first polarized light and a second polarized light,
reflecting the first polarized light by a surface to be detected of a component to form a first echo light,
reflecting the second polarized light by the surface to be detected to form a second echo light, wherein there is a preset shear amount between the centers of the first polarized light and the second polarized light;
causing the first echo light and the second echo light to interfere to form a signal light by the light generating and modulating apparatus; and
acquiring light intensity information of the signal light along a plurality of different polarization directions by a first detection apparatus, or acquiring total light intensity information of the signal light and light intensity information along at least one polarization direction.

15. The detection method of claim 14, wherein the first detection apparatus includes a first detection area, and the first detection area includes a plurality of first detection cell areas, the method further comprising:
controlling the first and the second polarized lights to scan the surface to be detected, and repeating steps of forming the signal light and acquiring the light intensity information.

16. The detection method of claim 15, wherein the scanning direction of the first polarized light and the second polarized light on the surface to be detected is the same as the arrangement direction of the plurality of first detection cell areas.

17. The detection method of claim 16, wherein the step of acquiring the first light intensity information includes: sampling the light intensity information of the signal light by the first detection apparatus, wherein during a time interval of two adjacent samplings, the scanning distance of the first detection area is the scanning step length, and a distance between the centers of adjacent first detection cell areas is equal to an integer multiple of the scanning step length.

18. The detection method of claim 15, wherein the step of controlling the scanning of the first polarized light and the second polarized light on the surface to be detected includes:

controlling the surface to be detected to move in a direction opposite to the scanning direction.

19. The detection method of claim 18, wherein the step of controlling the surface to be detected to move in a direction opposite to the scanning direction includes controlling the component to rotate around a rotation axis of the component;

and wherein the step of controlling the scanning of the first polarized light and the second polarized light on the surface to be detected further includes: after the surface to be detected rotates around the rotation axis one cycle, or during the time in which the surface to be detected rotates around the rotation axis, controlling the spot formed by the first polarized light and the second polarized light on the component to move along a diameter direction of the component.

20. The detection method of claim 15, wherein the light generating and modulating apparatus includes a first light source, and wherein the step of generating the first polarized light and the second polarized light includes:

generating a first detection light by the first light source to form the first polarized light and second polarized light based on the first detection light; and adjusting the shape and the size of the spot on the surface to be detected of the component formed by the first polarized light and the second polarized light, so that in the scanning direction of the first detection area on the surface to be detected, the size of the detection spot is greater than or equal to the size of the first detection area.

21. The detection method of claim 14, wherein light intensity information of the signal light along a plurality of different polarization directions acquired by the first detection apparatus, or total light intensity information of the signal light and a light intensity information along at least one polarization direction are used as a first light intensity distribution information of the signal light, and after acquiring the first light intensity distribution information, the method further comprises:

acquiring defect information of the component according to the first light intensity distribution information of the signal light.

22. The detection method of claim 21, wherein acquiring defect information of the component according to the first light intensity distribution information of the signal light includes:

acquiring initial information of the signal light according to the first light intensity distribution information;

performing low-pass filtering processing on the first light intensity distribution information to acquire noise information; and acquiring the defect information of the component to be detected according to the initial information and the noise information.

23. The detection method of claim 22, wherein the initial information includes initial phase information of the signal light, and the noise information includes a noise phase information, and wherein acquiring first defect information of the component according to the initial information and the noise information includes:

performing difference processing on the initial phase information and the noise phase information to acquire a target phase information; and acquiring the defect information of the component to be detected according to the target phase information.

* * * * *